Figure 1:
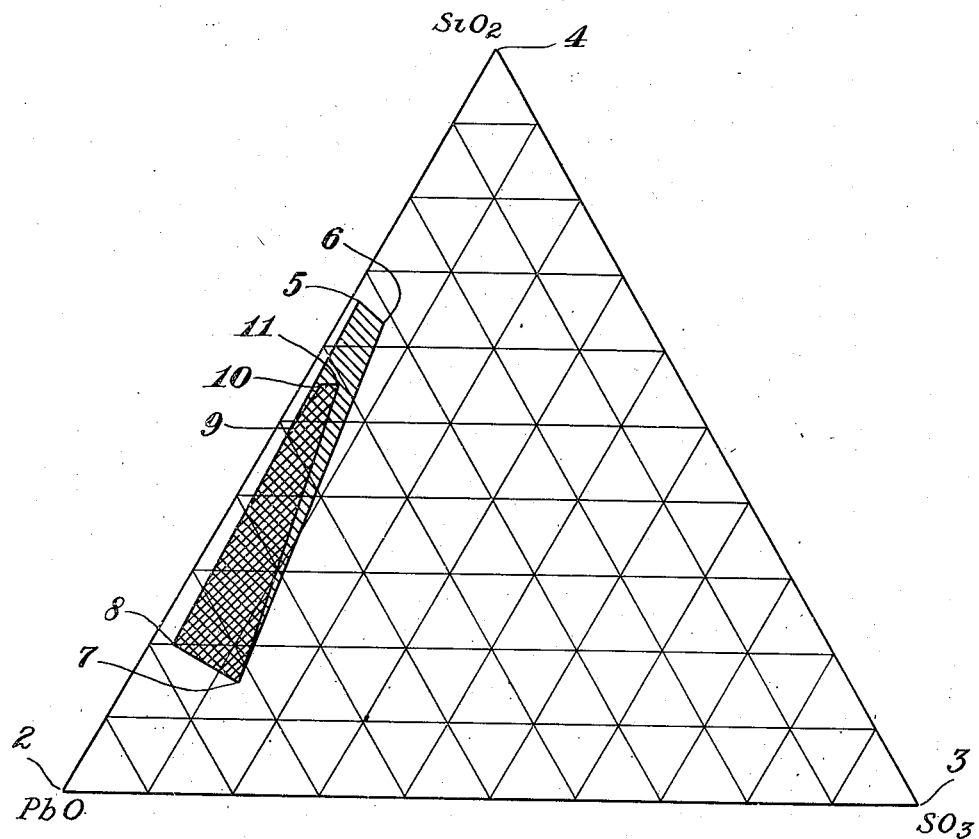

July 26, 1949.  F. J. WILLIAMS ET AL  2,477,277
COMPOSITE LEAD SULFATE-LEAD SILICATE
PIGMENT AND PROCESS OF MANUFACTURE
Filed March 27, 1946

FRANCIS J. WILLIAMS
ADRIAN R. PITROT
INVENTORS.

BY

ATTORNEY.

Patented July 26, 1949

2,477,277

UNITED STATES PATENT OFFICE 2,477,277

COMPOSITE LEAD SULFATE-LEAD SILICATE PIGMENT AND PROCESS OF MANUFACTURE

Francis J. Williams, Port Washington, and Adrian R. Pitrot, Hempstead, N. Y., assignors to National Lead Company, New York, N. Y., a corporation of New Jersey Application March 27, 1946, Serial No. 657,534

4 Claims. (Cl. 106—297)

This invention relates to pigments and more particularly to a novel composite lead sulphate-lead silicate pigment and a process for its manufacture.

Basic lead sulphate has long been known as a paint pigment. It is prepared commercially generally by either volatilizing lead sulphide ore or pig lead and sulphur and collecting the product as a finely divided sublimed basic lead sulphate; or adding sulphuric acid to a slurry of lead monoxide which may contain a small amount of lead acetate as a catalyst. While basic lead sulphate is somewhat widely used as a pigment, its properties are such that it is generally used in conjunction with other pigments in the formulation of so-called mixed paints. This is necessary because lead sulphate is generally deficient in weathering properties and, in order to obtain a long weathering paint film, this deficiency must be counteracted by the substantial presence of other pigments.

Silica, $SiO_2$, is used as a pigment when finely divided; however, its low refractive index gives it little hiding strength, and since it has low reactivity with common paint vehicles, it contributes little to the quality of the paint. Silica is most often used as a diluent or extender pigment in low cost paints. Lead silicate pigments have also been known, although their commercial use has not heretofore been widespread. Lead silicate pigments are made by furnacing a mixture of PbO and silica at high temperature under which conditions various lead silicate compounds may be formed. These pigments have generally shown good weathering properties; however, they have the very serious disadvantage of being unstable when exposed to light. This instability results in objectionable darkening of the paint film containing lead silicate when exposed to the weather and makes it substantially impossible to formulate white or light tinted coatings using these pigments.

This invention has for its principal object the preparation of a composite lead sulphate-lead silicate pigment of superior weathering quality, of good tinting strength, and which is stable in that it will not darken on exposure to light. Another object is to provide a pigment containing a substantial proportion of silica in chemical and/or physical combination without the normal deleterious effect of such silica content on the pigment properties. Another object is to provide a long weathering pigment of low lead content and corresponding low specific gravity. These and other objects will become apparent from the following description.

This invention in its broadest aspects contemplates first the formation of an intimate mixture containing PbO, $SO_3$, and $SiO_2$, which may preferably be in the form of an intimate mixture of lead sulphate or basic lead sulphate, or free litharge and lead sulphate or basic lead sulphate, and silica; and the subsequent calcination of this mixture at a temperature of from about 400° C. to about 700° C. and preferably from about 600° C. to 650° C. for a period of from 1 to 3 hours. The calcination results in a chemical and/or physical combination of the ingredients of the mixture to form the novel composite lead sulphate-lead silicate pigments.

The proportions of ingredients used in the practice of this invention may be varied over a considerable range and still be considered to fall within its scope. The drawing, Fig. 1, represents a diagram wherein the percentages of PbO, $SO_3$, and $SiO_2$ are plotted on a trilinear diagram (triangular graph). The point 2 represents 100 per cent PbO, 3 represents 100% $SO_3$, and 4 represents 100% $SiO_2$. The shaded area on the graph is bounded by straight lines joining the points 5, 6, 7, 8, which points correspond respectively to compositions listed below:

| Points: | Parts by weight | | |
|---|---|---|---|
| 5 | 33PbO | $1SO_3$ | $66SiO_2$ |
| 6 | 31PbO | $6SO_3$ | $63SiO_2$ |
| 7 | 72PbO | $13SO_3$ | $15SiO_2$ |
| 8 | 77PbO | $3SO_3$ | $20SiO_2$ |

The shaded area within these lines covers compositions having ingredients in the proportions contemplated in this invention. On a molar basis, it will be seen that the proportions of the ingredients may be varied such that for each mol of $SO_3$ present, there are from 2 to 10 mols of PbO, and for each mol of PbO, there are from 0.75 to 7.5 mols of $SiO_2$. It will be found that pigments made according to this invention, having a composition within the shaded area on the graph will have tinting strengths ranging from 40 to 120 when determined according to Gardner in his "Examination of Paints, Varnishes, and Lacquers," 9th edition, 1939, page 35, and will show good weathering properties and stability to light.

If it is desired to produce pigments according to this invention having tinting strengths in the higher ranges, that is between 100 and 120 or above as determined by Gardner, the ingredients should be taken in amounts so that the composition will fall within the heavier shaded area on the graph, Fig. 1, bounded by straight lines drawn joining points 7, 8, 9, 10, 11. These points indicate respectively the composition tabulated below:

| Points: | Parts by weight | | |
|---|---|---|---|
| 7 | 72PbO | 13SO$_3$ | 15SiO$_2$ |
| 8 | 77PbO | 3SO$_3$ | 20SiO$_2$ |
| 9 | 51PbO | 2SO$_3$ | 47SiO$_2$ |
| 10 | 43PbO | 2SO$_3$ | 55SiO$_2$ |
| 11 | 41PbO | 4SO$_3$ | 55SiO$_2$ |

The ingredients PbO, SO$_3$, and SiO$_2$ may be incorporated into the mixture in any convenient form. Also raw materials may be used which do not contain only these radicals, but which may give these products when subsequently heated in the calcination stage, for instance, in place of lead oxide, we may use metallic lead, lead carbonate, or even a previously compounded lead sulphate. As a source of silica, we may use precipitate silicic acid or fine native silica. We have found that sand stone or quartzite which is readily obtainable in pure form is quite satisfactory when ground to extreme fineness in a suitable mill such as a pebble mill. The SO$_3$ ingredient is preferably used in combination with lead oxide as a lead sulphate or basic lead sulphate. It is essential that an intimate mixture of the ingredients be obtained.

Good results may be obtained by mixing dry basic lead sulphate and silica or PbO, PbSO$_4$ and silica, in the proper proportions. Better results are obtained when these are mixed in an aqueous slurry. It is much to be preferred, however, to precipitate lead sulphate or basic lead sulphate in the presence of finely divided silica in a slurry while agitating continuously. This may be accomplished by placing the finely divided silica and litharge and sufficient water to form a slurry into a vessel equipped with a suitable agitating or stirring device. At this point, it is preferable, although not necessary, to add a small amount of acetic acid or some other acid catalyst for the purpose of dissolving a small portion of the litharge, thus supplying lead ions to the solution. To this slurry, sulphuric acid is slowly added with vigorous agitation during which addition lead sulphate or basic lead sulphate is formed. The amount and character of this lead sulphate is dependent on the ratio of litharge to sulphuric acid as will be evident to those skilled in the art. It is possible to produce monobasic lead sulphate 2PbOSO$_3$ or hydrous tribasic lead sulphate 4PbOSO$_3$H$_2$O or a mixture. Further, it is possible to have the tribasic sulphate plus excess lead oxide when the ratio of PbO to SO$_3$ is greater than 4 to 1. Such mixtures up to a ratio of 10PbO to 1SO$_3$ are within the scope of this invention.

When the addition of sulphuric acid to the slurry is complete, the precipitate is dewatered by filtering and drying. This may be done by any of the standard methods generally employed, or the slurry may be transferred directly to a continuous rotary kiln in which the first portion will act as a drier and the subsequent portion as a calciner. The dried slurry is calcined at a temperature of from about 400° C. to about 700° C. and preferably from about 600° C. to 650° C. The temperature of calcination is important, since temperatures below 400° C. are generally ineffective. Temperatures substantially exceeding 700° C. complete the reaction speedily, but often produce a partially sintered product which is gritty in character. The calcination time should generally be between 1 and 3 hours and preferably about 2 hours. Batches calcined under these preferred conditions are white in appearance and completely soft and not gritty. They are thus ideally suited for incorporation into paints with a minimum of grinding.

In order that this invention may be more clearly understood, the following example will illustrate the preparation of composite lead sulphate-lead silicate pigment.

EXAMPLE I 18 liters of water, 2223 grams of litharge (lead oxide), 2000 grams of finely divided silica and 40 grams of 99% acetic acid were placed in a 25 liter capacity glass vessel equipped with a wooden turbine type stirring device. While the slurry was maintained in vigorous agitation, 231 grams of sulphuric acid (95%) previously diluted to 500 milliliters with water, was added slowly over a period of 1 hour. The system then consisted of a slurry of hydrous tribasic lead sulphate and finely divided silica in a dilute lead acetate solution as determined by chemical and microscopic means. The solid portion was separated on a Buchner funnel, washed free from lead acetate and dried. The dry product was calcined in a muffle furnace at 600° C. for 2 hours. The calcined product was a soft powder with whiteness equivalent to the best grade of basic carbonate white lead. On analysis, the following constants were found.

| | |
|---|---|
| %PbO | 47.85 |
| %SO$_3$ | 4.29 |
| %SiO$_2$ | 47.86 |
| Tinting strength | 120 |
| Oil absorption | 17.9 g. oil/100 g. pigment |
| Specific gravity | 4.07 |

To test the paint making properties of the composite lead sulphate-lead silicate prepared above, a paint was made using this material mixed with linseed oil, drier, and volatile thinner at a pigment volume ratio of 29. Three coats of this paint were applied to cedar panels which were exposed in Florida in comparison to similar panels using a 29 pigment volume ratio white lead paint. The white lead panels started to chalk in 16 weeks while the panels painted with the paint pigmented with the product of this invention had not started to chalk in 34 weeks which indicates excellent durability. Furthermore, the paint films containing the composite lead sulphate-lead silicate pigment remained intact and white throughout the exposure and showed no tendency toward darkening or discoloration.

A unique feature of this invention is the comparatively high SiO$_2$ content which may be present in the products of this invention without proportionate impairment of the physical properties of the pigment. The amount of SiO$_2$ may be substantially greater than that necessary to form lead silicate with the amount of PbO present, considering the PbO combined with the SO$_3$ as lead sulphate. This phenomenon suggests that a physical as well as a chemical combination of the ingredients occurs during calcination, and that the chemically uncombined silica becomes coated with lead silicate and/or lead sulphate. It will be found that if the proportion of silica is increased over that given in the limits shown, apparently uncoated silica will be evident in the product, and the amount over and above that which could have been used according to this invention will be present as a diluent or extender with proportionate lowering of the pigment properties.

Generally speaking, the proportions of the ingredients will influence to some degree the properties of the calcined pigment. The higher PbO content compositions will show somewhat greater tinting strengths. Higher $SiO_2$ content will give lower specific gravity. A higher $SO_3$ content will provide somewhat greater stability toward light, although all compositions within the general shaded area shown on the graph will be shown to have satisfactory stability. As an example of the general trend shown in the pigment properties when the composition of the pigment is varied, the following table gives principal properties of several different finished pigment compositions.

TABLE I

*Properties of Lead Sulphate-Silica Pigments*

| Example | Per Cent by Weight | | | Tinting Strength | Oil Absorption | Weathering Quality |
|---|---|---|---|---|---|---|
| | PbO | $SO_3$ | $SiO_2$ | | | |
| 2 | 49.12 | 1.76 | 49.12 | 85 | 16.9 | Excellent. |
| 3 | 48.75 | 2.50 | 48.75 | 105 | 19.7 | Do. |
| 4 | 48.55 | 2.90 | 48.55 | 100 | 16.1 | Do. |
| 5 | 47.18 | 5.64 | 47.18 | 100 | 15.8 | Do. |
| 6 | 32.37 | 2.90 | 64.73 | 60 | 21.6 | Good. |
| 7 | 76.00 | 3.00 | 21.00 | 100 | 10.8 | Excellent. |

The novel lead sulphate silica pigment products of this invention have numerous advantages over other white pigments and are definitely superior to mixtures of pigments having the same analytical ingredients taken in the same proportions. They combine to give properties of both basic lead sulphate and lead silicate without the poor weathering qualities associated with one and the light instability associated with the other, and also many contain a substantial amount of silica without proportionate deleterious effect from the presence of this generally low grade pigment. The weathering qualities of paint made with the new pigments have been shown to be excellent and even better than basic carbonate white lead which has long been accepted as the standard white pigment. Another advantage of the new pigments are their light weight. Since a large proportion of the composition may consist of silica which has a low specific gravity, the specific gravity of the combined pigment may be considerably lower than for either lead carbonate or basic lead sulphate white lead. This low specific gravity is obviously a useful factor in certain applications where light weight pigments are desirable and may be further advantageous when considering pigments on a volume basis as, for instance, when formulating by the gallon.

It will be understood that the examples shown are given merely for the purpose of illustration and that other variations and embodiments may be considered to fall within the scope of this invention as limited by the appended claims.

We claim:

1. A composite lead sulphate-lead silicate pigment consisting essentially of PbO, $SO_3$, $SiO_2$ in physico-chemical combination, the amounts of PbO, $SO_3$, and $SiO_2$ analytically present being in such proportions by weight as may be represented by a point lying within that area of a trilinear diagram of composition $PbO-SO_3-SiO_2$ defined as bounded by straight lines joining in series points represented by the compositions:

$33PbO:1SO_3:66SiO_2$
$31PbO:6SO_3:63SiO_2$
$72PbO:13SO_3:15SiO_2$
$77PbO:3SO_3:20SiO_2$

2. A composite lead sulphate-lead silicate pigment of tinting strength at least 100 consisting essentially of PbO, $SO_3$, $SiO_2$ in physico-chemical combination, the amounts of PbO, $SO_3$ and $SiO_2$ analytically present being in such proportions by weight as may be represented by a point lying within that area of a trilinear diagram of composition $PbO-SO_3-SiO_2$ defined as bounded by straight lines joining in series points represented by the compositions:

$72PbO:13SO_3:15SiO_2$
$77PbO:3SO_3:20SiO_2$
$51PbO:2SO_3:47SiO_2$
$43PbO:2SO_3:55SiO_2$
$41PbO:4SO_3:55SiO_2$

3. A composite lead sulphate-lead silicate pigment consisting essentially of PbO, $SO_3$, $SiO_2$ in physico-chemical combination, said PbO, $SO_3$, and $SiO_2$ being analytically present in proportions by weight of about 47.8% PbO, 4.3% $SO_3$ and 47.9% $SiO_2$.

4. A process for manufacture of composite lead sulphate-lead silicate pigments which comprises forming an intimate mixture consisting essentially of lead monoxide, PbO, at least partially converted to lead sulphate, $PbSO_4$, and silica $SiO_2$ the amounts of PbO, $SO_3$, and $SiO_2$ analytically present in said mixture being in such proportions by weight as may be represented by a point lying within that area of a trilinear diagram of composition $PbO-SO_3-SiO_2$ defined as bounded by straight lines joining in series points represented by the compositions:

$33PbO:1SO_3:66SiO_2$
$31PbO:6SO_3:63SiO_2$
$72PbO:13SO_3:15SiO_2$
$77PbO:3SO_3:20SiO_2$ and heating said mixture at a temperature of from about 400° C. to about 700° C. for a period of from 1 to 3 hours.

FRANCIS J. WILLIAMS.
ADRIAN R. PITROT.

REFERENCES CITED

The following references are of record in the file of this patent:

UNITED STATES PATENTS

| Number | Name | Date |
|---|---|---|
| 2,391,118 | Barton | Dec. 18, 1945 |
| 2,383,284 | Barton | Aug. 21, 1945 |